G. GOAD.
HAY OR GRAIN CARRIER AND ELEVATOR.
APPLICATION FILED DEC. 30, 1915.

1,283,498.

Patented Nov. 5, 1918.

Inventor
Gertrude Goad.
By [signature] atty.

UNITED STATES PATENT OFFICE.

GERTRUDE GOAD, OF REIGATE, ENGLAND.

HAY OR GRAIN CARRIER AND ELEVATOR.

1,283,498. Specification of Letters Patent. Patented Nov. 5, 1918.

Application filed December 30, 1915. Serial No. 69,395.

*To all whom it may concern:*

Be it known that I, GERTRUDE GOAD, a subject of the King of Great Britain, and resident of Castle Keep, Reigate, in the county of Surrey, England, have invented a new and useful Hay or Grain Carrier and Elevator, of which the following is a specification.

This invention relates to a new or improved apparatus for carrying hay or the like and for elevating it for stacking or loading purposes.

According to this invention, the apparatus consists of a low frame mounted on wheels, open at the front and more or less inclosed at the sides and back to form a box or receptacle for the hay or other crop, suitable means being provided for effecting the transfer of the hay or the like from the ground to the said receptacle as the apparatus is drawn along or propelled.

The device for drawing the receptacle along the ground is conveniently connected at or near the ends of the front axle so as to leave the whole of the front clear for the unimpeded transfer or delivery of the hay into the receptacle. To avoid repetition the expression "hay" will be hereinafter employed to denote other crops or like material as well as hay. For transferring hay in swaths or scattered on the ground, the apparatus is provided in addition with a device which is preferably attachable to and detachable from the front of the receptacle.
A suitable arrangement for this purpose comprises a framework having mounted therein a series of rotary forks similar to those of a hay maker or tedder and the forks are rotated by gearing from the traveling wheels of the device. Or the forks may be driven from a wheel or wheels of the receptacle. In order to raise bodily or elevate the whole of the hay collected in the receptacle, the latter or its bottom is adapted to be raised and lowered on the wheeled frame by gearing, suitable means being provided for guiding the receptacle or its bottom while being raised and lowered.

Figure 1:
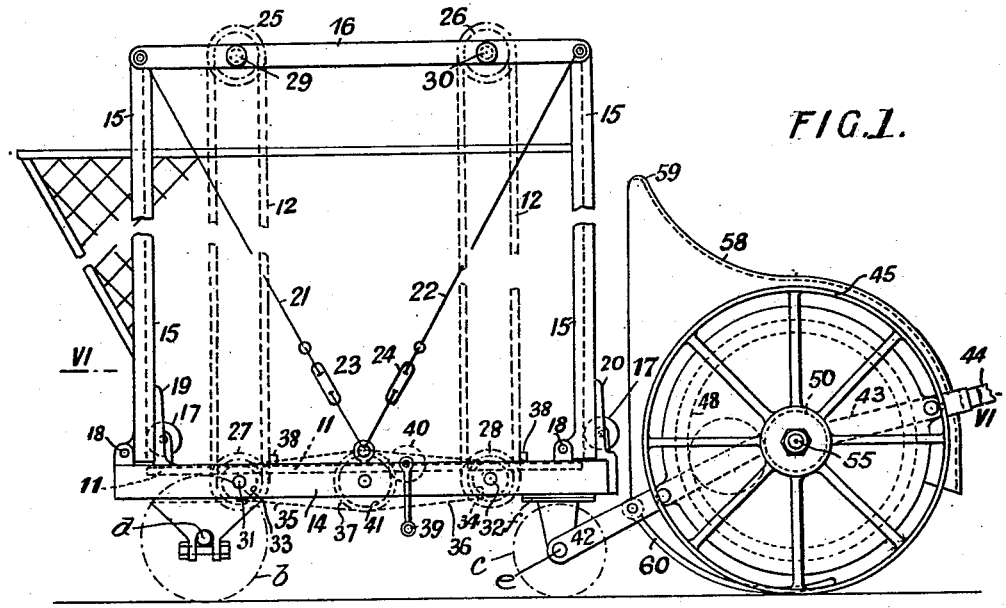

Figure 1 of the accompanying drawings is an elevation of an apparatus constructed according to this invention.

Figure 2:
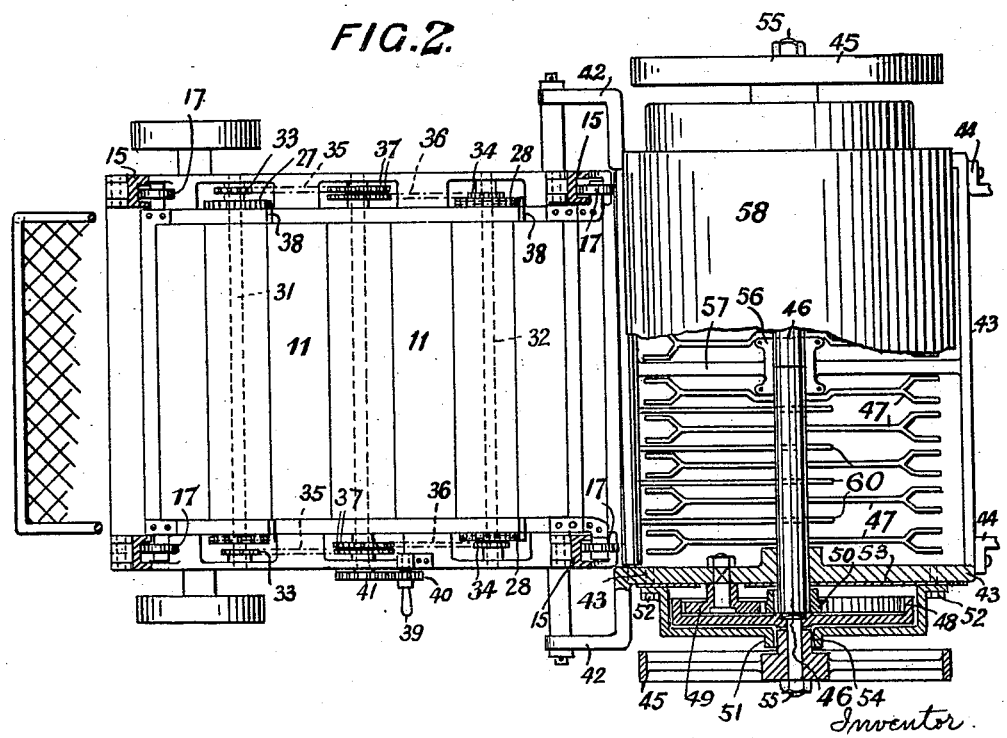

Fig. 2 is a part sectional plan view on the line VI—VI, Fig. 1.

As shown the apparatus consists of rectangular framework $a$ mounted on four wheels $b$ and $c$ and near the ground. The axle $d$ of the two hind wheels $b$ is suitably rigidly connected to the frame or springs may be interposed and the axle $e$ of the two front wheels $c$ is appropriately mounted on a swiveling fore carriage or fifth wheel $f$.

The apparatus is conveniently made no wider than will allow of passing freely through an ordinary field gate and it may be ten feet high or more, but, in the latter case it may be arranged so as to travel along a common road with the pillars in a horizontal, instead of a vertical position as otherwise there would be a danger of coming into collision with the overhanging branches of trees, or the head of a gateway or doorway. Or the pillars may be made to assume a more or less horizontal position. The bottom 11 of the receptacle is raised and lowered by chains 12 of which there may be four, one near each corner and all four chains are driven from one crank handle 39. The frame 14 of the apparatus is provided at each corner with a pillar or upright 15 all of which are pivotally connected together at the top by horizontal frame members 16. The pillars are suitably of channel section and each of the corners of the bottom is provided with a roller 17 to reduce friction in the raising and lowering of the receptacle. The pillars 15 are suitably hinged at 18 so as to reduce the height by allowing them to fold down when not required, stops 19 and 20 being provided assisted by the rods 21 and 22 and setting up screws 23 and 24 for stiffening and maintaining them in a vertical position.

For raising and lowering the receptacle from one point, the chains 12 pass over upper and lower sprocket wheels 25, 26, 27 and 28 the upper wheels being mounted on studs 29, 30 fixed to the horizontal frame members 16, of which there is one on each side. The bottom 11 is connected at 38 to a link of each chain 12 of which there are four, two on one side and two on the other side of the apparatus. The lower wheels 27 and 28 (two on each side) are keyed to shafts 31 and 32 mounted in bearings on the frame 14. The shafts 31 and 32 have keyed thereto other sprocket wheels 33 and 34 which by chains 35 and 36 and two like sprocket wheels 37 receive motion from a crank handle 39 having keyed to its shaft a pinion 40 which meshes with a spur wheel 41 fixed to or made integral with the twin sprocket wheels 37.

If it be desired to pick up the hay, which may be in swaths or scattered on the ground, the apparatus is coupled by links 42 to the fore carriage at the front of the apparatus.

The four-wheeled receptacle may be used for merely picking up the cocked hay without the elevating arrangement and without the detachable front portion for throwing the hay into the receptacle or it may be used with the detachable front portion to throw the loose hay into the receptacle or the said front portion may be used alone as a hay-making machine or simple spreader.

Obviously any suitable device or arrangement of parts may be employed for disconnecting the rotary forks from their propelling means or for raising them above the ground or for effecting both purposes. Furthermore, the apparatus may also be provided with a driver's seat and with means for raising and lowering the slope or rakes. Finally the apparatus may be used as an elevator alone, whether attached to the front portion or not.

I claim:—

1. In a hay carrier and elevator, a frame comprising side members, upright end members pivotally connected to the side members, horizontal connecting members pivotally connected to the tops of the end members, stays connecting the latter to the side members, a bottom, rollers thereon arranged to travel on the upright members, and means to raise and lower said bottom.

2. In a hay carrier and elevator, a frame comprising side members, upright end members provided with channels and pivotally connected to the side members, horizontal connecting members pivotally connected to the tops of the end members, stays connecting the latter to the side members, a bottom, rollers thereon arranged to travel in the channels formed in the upright members, endless carriers mounted in said frame and connected to said bottom, a driving member, and means to operatively connect the latter with the carriers.

3. In a hay carrier and elevator, a frame comprising side members, wheels supporting the latter, uprights provided with longitudinal channels and pivotally connected to the side members near the ends of the latter, horizontal connecting members pivotally connected to the tops of said uprights, adjustable stays connecting the latter to the side members, a bottom movably mounted between the side members, rollers on the bottom arranged to travel in the longitudinal channels formed in the uprights, sprockets journaled on the side and connecting members, sprocket chains passing over said sprockets and connected to the bottom, and means to rotate said sprockets.

4. In a hay carrier and elevator, a frame comprising side members, wheels supporting the latter, uprights provided with longitudinal channels and pivotally connected to the side members near the ends of the latter, horizontal connecting members pivotally connected to the tops of said uprights, adjustable stays connecting the latter to the side members, a bottom movably mounted between the side members, rollers on the bottom arranged to travel in the longitudinal channels formed in the uprights, sprockets journaled on the side and connecting members, sprocket chains passing over said sprockets and connected to the bottom, a drive shaft, and means to operatively connect the latter with said sprockets.

GERTRUDE GOAD.

Copies of this patent may be obtained for five cents each, by addressing the "Commissioner of Patents, Washington, D. C."